United States Patent [19]

Sakata et al.

[11] Patent Number: 5,216,604
[45] Date of Patent: Jun. 1, 1993

[54] METHOD AND SYSTEM FOR EDITING DATA BY LIMITING CURRENT OPERATIONS IN ACCORDANCE WITH PREVIOUS OPERATIONS

[75] Inventors: Junko Sakata, Ichikawa; Hiroyuki Maezawa, Tama, both of Japan

[73] Assignee: Hitachi, Ltd., Tokyo, Japan

[21] Appl. No.: 442,076

[22] Filed: Nov. 28, 1989

[30] Foreign Application Priority Data

Nov. 29, 1988 [JP] Japan .................. 63-302049

[51] Int. Cl.⁵ .................................. G06F 15/38
[52] U.S. Cl. ...................... 364/419; 395/146
[58] Field of Search ........... 364/419; 395/146, 198

[56] References Cited

PUBLICATIONS

"Word Perfect: Quickstart" pp. 68, & 96-55.
"Handy Guide to Orbit", Orbit Search Service Offices.

Primary Examiner—Gail O. Hayes
Attorney, Agent, or Firm—Fay, Sharpe, Beall, Fagan, Minnich & McKee

[57] ABSTRACT

Disclosed herein is a data edition supporting method in an information processing system having a computer, interactive terminals and a clock. The method comprises the steps of finding from the clock the time at which a data item was edited; of storing the obtained time in relation to its corresponding data item; of checking to see whether, during data editing by use of an interactive terminal, the data editing time comes before or after a certain time; and of determining the type of editing in accordance with the results of the judgment made in the preceding step.

14 Claims, 24 Drawing Sheets

FIG. 3

MODULE SPECIFICATION

| MODULE NAME | abc | | |
|---|---|---|---|

| VARIABLE | | | | PROCESS |
|---|---|---|---|---|
| NO. | NAME | TYPE | CONTENTS | |
| 1 | x | int | VERTICAL LENGTH | (1) s1←VERTICAL LENGTH x × HORIZONTAL LENGTH y |
| 2 | y | int | HORIZONTAL LENGTH | |
| 3 | h | int | HEIHT | (2) RETURN s1 × h/3 |
| 4 | s1 | int | BOTTOM AREA | |
| 5 | | | | |
| 6 | | | | |
| 7 | | | | |

FIG. 4

| ITEM | | DATA | | | EDITING TIME |
|---|---|---|---|---|---|
| MODULE NAME | | abc | | | 880610101025 |
| VARIABLE | 1 | x | int | VERTICAL LENGTH | 880611093521 |
| | 2 | y | int | HORIZONTAL LENGTH | 880611093545 |
| | 3 | h | int | HEIGHT | 880611093606 |
| | 4 | s1 | int | BOTTOM AREA | 880613131136 |
| | 5 | | | | 999999999999 |
| | 6 | | | | 999999999999 |
| | 7 | | | | 999999999999 |
| PROCESS | 1st ROW | (1) s1←VERTICAL LENGTH x × HORIZONTAL LENGTH y | | | 880613130407 |
| | 2nd ROW | (2) RETURN s1 × h/3 | | | 880613130501 |
| | 3rd ROW | | | | 999999999999 |
| | ⋮ | ⋮ | | | ⋮ |
| | 30th ROW | | | | 999999999999 |

FIG. 5

| MODULE SPECIFICATION |||||
|---|---|---|---|---|
| MODULE NAME || abc || PROCESS |
| VARIABLE |||| (1) s1←VERTICAL LENGTH x × HORIZONTAL LENGTH y |
| NO. | NAME | TYPE | CONTENTS | |
| 1 | x | int | VERTICAL LENGTH | (2) RETURN s1 × h/3 |
| 2 | y | int | HORIZONTAL LENGTH | |
| 3 | h | int | HEIGHT | |
| 4 | s1 | int | BOTTOM AREA | |
| 5 | | | | |
| 6 | | | | |
| 7 | | | | |

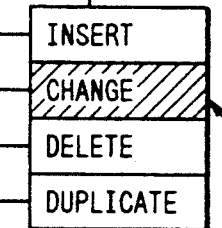

INSERT
CHANGE
DELETE
DUPLICATE

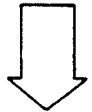

| ONLY DUPLICATION IS ALLOWED TO THE DATA |||||
|---|---|---|---|---|
| MODULE NAME || abc || PROCESS |
| VARIABLE |||| (1) s1←VERTICAL LENGTH x × HORIZONTAL LENGTH y |
| NO. | NAME | TYPE | CONTENTS | |
| 1 | x | int | VERTICAL LENGTH | (2) RETURN s1 × h/3 |
| 2 | y | int | HORIZONTAL LENGTH | |
| 3 | h | int | HEIGHT | |
| 4 | s1 | int | BOTTOM AREA | |
| 5 | | | | |
| 6 | | | | |
| 7 | | | | |

FIG. 6

| MODULE SPECIFICATION |||||
|---|---|---|---|---|
| MODULE NAME || abc || PROCESS |
| VARIABLE |||| (1) s1←VERTICAL LENGTH x × HORIZONTAL LENGTH y |
| NO. | NAME | TYPE | CONTENTS | |
| 1 | x | int | VERTICAL LENGTH | (2) RETURN s1 × h/3 |
| 2 | y | int | HORIZONTAL LENGTH | |
| 3 | h | int | HEIGHT | |
| 4 | s1 | int | BOTTOM AREA | |
| 5 | | | | |
| 6 | | | | |
| 7 | | | | |

INSERT
CHANGE
DELETE
DUPLICATE

⇓

| LET DATA BE INPUTTED |||||
|---|---|---|---|---|
| MODULE NAME || abc || PROCESS |
| VARIABLE |||| (1) s1←VERTICAL LENGTH x × HORIZONTAL LENGTH y |
| NO. | NAME | TYPE | CONTENTS | |
| 1 | x | int | VERTICAL LENGTH | (2) RETURN s1 × h/3 |
| 2 | y | int | HORIZONTAL LENGTH | |
| 3 | h | int | HEIGHT | |
| 4 | s1 | 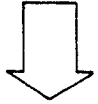 | BOTTOM AREA | |
| 5 | | | | |
| 6 | | | | |
| 7 | | | | |

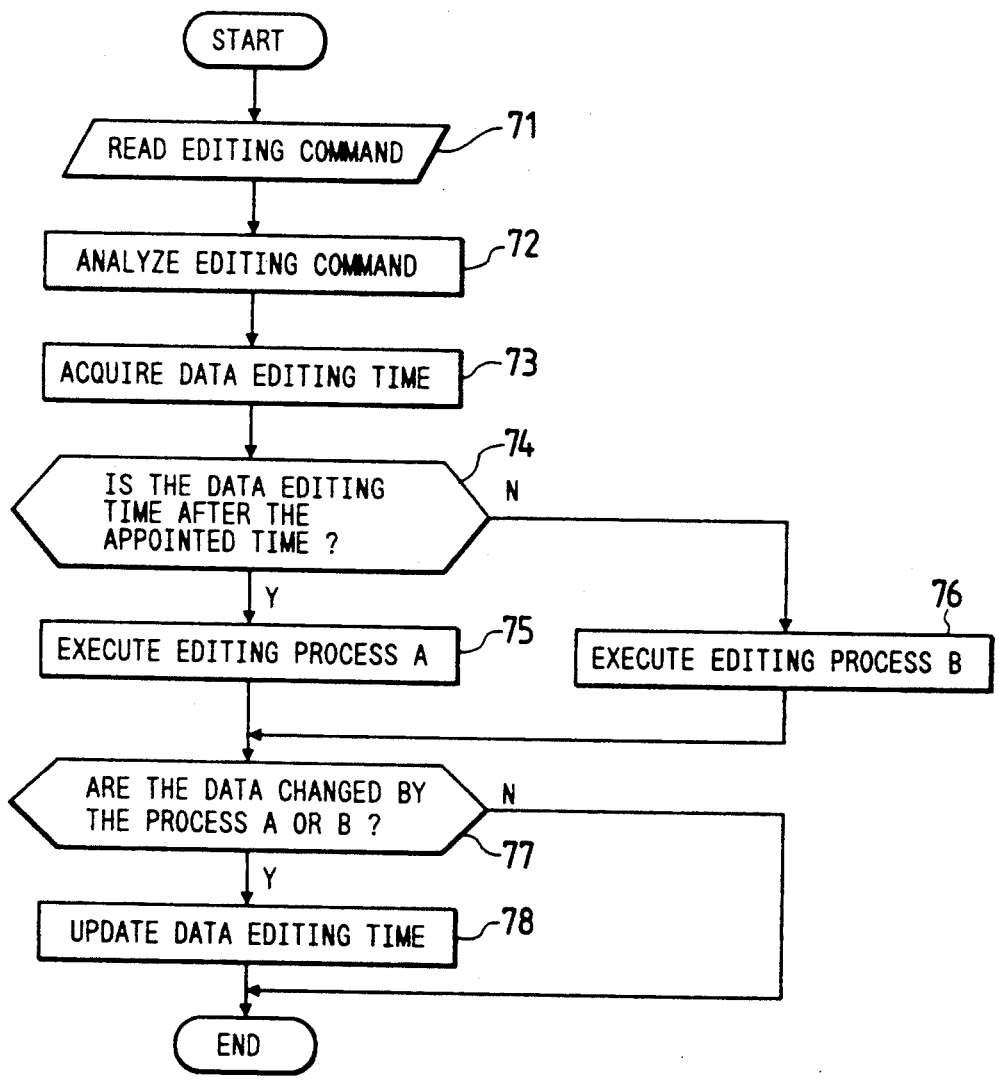

FIG. 8

| EDITING OPERATION FOR DATA | EDITING PROCESS A | EDITING PROCESS B |
|---|---|---|
| DESIGNATE AS INSERTING POSITION | LET DATA BE INPUTTED, AND INSERT THE INPUTTED DATA JUST BEFORE THE DESIGNATED DATA | NO CHANGE OF DATA; DISPLAY "ONLY DUPLICATION IS ALLOWED TO THE DATA" |
| DESIGNATE FOR DELETING | DELETE THE DESIGNATED DATA | NO CHANGE OF DATA; DISPLAY "ONLY DUPLICATION IS ALLOWED TO THE DATA" |
| DESIGNATE FOR CHANGING | LET DATA BE INPUTTED, AND REPLACE THE DESIGNATED DATA TO THE INPUTTED DATA | NO CHANGE OF DATA; DISPLAY "ONLY DUPLICATION IS ALLOWED TO THE DATA" |
| DESIGNATE AS AN ORIGINAL OF DUPLICATION | LET BE DESIGNATED THE INSERTING POSITION OF THE DATA TO BE DUPLICATED, AND INSERT DUPLICATED OLD DATA TO THE POSITION | IBID TO THE LEFT |
| DESIGNATE AS INSERTING POSITION OF A DUPLICATED OBJECT | INSERT THE DATA SAME WITH THE DATA DESIGNATED AS AN ORIGINAL OF DUPLICATION JUST BEFORE THE DESIGNATED DATA | NO CHANGE OF DATA; DISPLAY "DUPLICATION IS NOT ALLOWED TO THE POSITION" |

FIG. 10

| TABLE SPECIFICATION | | | |
|---|---|---|---|
| TABLE NAME | | abctbl | |
| NO. | DATA NAME | TYPE | CONTENTS |
| 1 | a1 | int | NUMBER OF COMMANDS |
| 2 | b2 | int | NUMBER OF OPERANDS |
| 3 | c3 | char | 1st CHARACTER OF THE COMMAND |
| 4 | d4 | char* | CHARACTER ARRAY OF THE COMMAND |
| 5 | e5 | int | CHARACTER NUMBER OF THE COMMAND |
| 6 | | | |
| 7 | | | |
| 8 | | | |
| 9 | | | |
| 10 | | | |
| 11 | | | |

FIG. 13

| EDITING OPERATION FOR DATA | EDITING PROCESS A | EDITING PROCESS B | EDITING PROCESS C |
|---|---|---|---|
| DESIGNATE AS INSERTING POSITION | LET DATA BE INPUTTED, AND INSERT THE INPUTTED DATA JUST BEFORE THE DESIGNATED DATA | DISPLAY THE MESSAGE "ALREADY REFERRED; MAY IT BE INSERTED ?"; AND INSERT WHEN THE INPUT IS "Y" | DISPLAY THE MESSAGE "DUPLICATED TO (INSERTING POSITION OF THE DUPLICATION); MAY IT BE INSERTED ?", AND INSERT WHEN THE INPUT IS "Y" |
| DESIGNATE FOR DELETING | DELETE THE DESIGNATED DATA | DISPLAY THE MESSAGE "ALREADY REFERRED; MAY IT BE DELETED ?"; AND DELETE WHEN THE INPUT IS "Y" | DISPLAY THE MESSAGE "DUPLICATED TO (INSERTING POSITION OF THE DUPLICATION); MAY IT BE DELETED ?", AND DELETE WHEN THE INPUT IS "Y" |
| DESIGNATE FOR CHANGING | LET DATA BE INPUTTED, AND REPLACE THE DESIGNATED DATA TO THE INPUTTED DATA | DISPLAY THE MESSAGE "ALREADY REFERRED; MAY IT BE CHANGED ?"; AND CHANGE WHEN THE INPUT IS "Y" | DISPLAY THE MESSAGE "DUPLICATED TO (INSERTING POSITION OF THE DUPLICATION); MAY IT BE CHANGED ?", AND CHANGE WHEN THE INPUT IS "Y" |
| DESIGNATE AS AN ORIGINAL OF DUPLICATION | LET BE DESIGNATED THE INSERTING POSITION OF THE DATA TO BE DUPLICATED, AND INSERT DUPLICATED OLD DATA TO THE POSITION | IBID TO THE LEFT | IBID TO THE LEFT |
| DESIGNATE AS INSERTING POSITION OF A DUPLICATED OBJECT | INSERT THE DATA SAME WITH THE DATA DESIGNATED AS AN ORIGINAL OF DUPLICATION JUST BEFORE THE DESIGNATED DATA | DISPLAY THE MESSAGE "ALREADY REFERRED; MAY IT BE DUPLICATED ?" AND DUPLICATE WHEN THE INPUT IS "Y" | DISPLAY THE MESSAGE "DUPLICATED TO (INSERTING POSITION OF THE DUPLICATION); MAY IT BE DUPLICATED ?" AND DUPLICATE WHEN THE INPUT IS "Y" |

FIG. 17(a)

| TABLE SPECIFICATION | | | |
|---|---|---|---|
| TABLE NAME | | zutbl | |
| NO. | DATA NAME | TYPE | CONTENTS |
| 1 | x | int | VERTICAL LENGTH |
| 2 | y | int | HORIZONTAL LENGTH |
| 3 | h | int | HEIGHT |
| 4 | | | |
| 5 | | | |
| 6 | | | |
| 7 | | | |

FIG. 17(b)

| DEFINITION DIAGRAM OF INTERNAL DATA | | | |
|---|---|---|---|
| MODULE NAME | | abc | |
| NO. | DATA NAME | TYPE | CONTENTS |
| 1 | sl | int | BOTTOM AREA |
| 2 | v | int | VOLUME |
| 3 | | | |
| 4 | | | |
| 5 | | | |
| 6 | | | |
| 7 | | | |

FIG. 17(c)

| MODULE SPECIFICATION | | | |
|---|---|---|---|
| MODULE NAME | abc | | |

| VARIABLE | | | | PROCESS |
|---|---|---|---|---|
| NO. | NAME | TYPE | CONTENTS | |
| 1 | x | int | VERTICAL LENGTH | (1) s1←VERTICAL LENGTH x × HORIZONTAL LENGTH y |
| 2 | y | int | HORIZONTAL LENGTH | |
| 3 | h | int | HEIGHT | (2) RETURN s1 × h/3 |
| 4 | s1 | int | BOTTOM AREA | |
| 5 | v | int | VOLUME | |
| 6 | | | | |
| 7 | | | | |

FIG. 18

| ITEM | | DATA | | | EDITOR |
|---|---|---|---|---|---|
| MODULE NAME | | abc | | | MODULE RELATION DIAGRAM |
| VARIABLE | 1 | x | int | VERTICAL LENGTH | TABLE SPECIFICATION |
| | 2 | y | int | HORIZONTAL LENGTH | TABLE SPECIFICATION |
| | 3 | h | int | HEIGHT | TABLE SPECIFICATION |
| | 4 | s1 | int | BOTTOM AREA | DEFINITION DIAGRAM OF INTERNAL DATA |
| | 5 | v | int | VOLUME | DEFINITION DIAGRAM OF INTERNAL DATA |
| | 6 | | | | |
| | 7 | | | | |
| PROCESS | 1st ROW | (1) s1←VERTICAL LENGTH x × HORIZONTAL LENGTH y | | | MODULE SPECIFICATION |
| | 2nd ROW | (2) RETURN s1 × h/3 | | | MODULE SPECIFICATION |
| | 3rd ROW | | | | |
| | ⋮ | | | | |
| | 30th ROW | | | | |

FIG. 21

MODULE SPECIFICATION (221)

| MODULE NAME | ///////// | PROCESS |

I/O DATA

| NO. | DATA NAME | TYPE | CONTENTS |
|-----|-----------|------|----------|
| 1 | | | |
| 2 | | | |
| 3 | | | |

(222)

INTERNAL DATA

| NO. | DATA NAME | TYPE | CONTENTS |
|-----|-----------|------|----------|
| 1 | | | |
| 2 | | | |
| 3 | | | |
| 4 | | | |
| 5 | | | |

| AREA | USER IDENTIFICATION |
|------|---------------------|
| AREA 1 | U 01 |
| AREA 2 | U 22 |
| AREA 3 | U 25 |
| AREA 4 | U 25 |
| | |
| | |
| | |

METHOD AND SYSTEM FOR EDITING DATA BY LIMITING CURRENT OPERATIONS IN ACCORDANCE WITH PREVIOUS OPERATIONS

BACKGROUND OF THE INVENTION

1. Field of the Invention

The present invention relates to a method and a system for supporting data editing in a computer environment and, more particularly, to a method and a system adapted to generate a collection of mutually associated data such as software specifications while maintaining the consistency of such data.

2. Description of the Prior Art

Prior art editing methods of this kind have been characterized by their ability to allow or refuse their users to gain access to given files, and to allow the accepted users to merely reference or update particular data therein. This function is discussed illustratively in "Standard UNIX Handbook," by Richard Gauthier (Japanese translation from ASCII Publications, 1982).

Some of these systems also have had a function of inhibiting partial update of the data edited by a particular editor. This function is described illustratively in "OFIS/POL-EV Grammar/Operation Manual" for Hatachi Creative Workstation 2050 (Hitachi, Ltd., 1985). This technique involves inhibiting all users from updating certain designated portions of the data.

There are cases where a plurality of users edit a collection of mutually associated data such as software specifications. In such cases, the first prior art function mentioned above has a problem. That is, data can only be protected in units of files even when mutually associated data exist in a plurality of files. The second prior art function cited above also has a problem. Partial data in each file may be selectively protected, but the protection extends to all users. It is impossible to protect the data depending on the type or qualifications of the user.

Conventionally, the type of allowable access was changed (e.g., data update inhibited) only when a user so designated. Once the access type was set, it was inherited unless and until it was changed by the user. Thus it was impossible to provide such forms of editing supporting as inhibiting the updating of the finalized portions of specifications whenever such finalizing occurred or inhibiting the alteration of only the associated portions of data whenever such association took place.

SUMMARY OF THE INVENTION

It is therefore the primary object of the present invention to provide a method and a system for providing editing supporting such that individual, mutually associated data may be protected against change at any given point in time during editing so as to maintain the consistency thereof.

To attain the above-mentioned object, the present invention provides a number of techniques. One technique involves implementing a data editing supporting method in a data processing system comprising a host computer and interactive terminals. The time of day at which each data item was last edited is stored. Whether such editing time comes before or after an appointed time provides a basis for determining the type of editing on each data item.

Another technique involves determining the type of editing on individual data based on their operation history. A check is made to see if each data item has been referenced or copied in the past. That is, whether or not a certain data item may have influenced any other data item provides another basis for determining the type of editing on that data item.

Still another technique involves determining the type of editing on individual data based on editor type. A dedicated editor is provided to edit only those data associated with any other data. When a data item edited by the dedicated editor is also edited by any other editor, the data item is matched with information about the latter editor. Which of the editors has handled a certain data item provides yet another basis for determining the type of editing regarding that data item.

Yet another technique involves determining the type of editing on individual data based on the editing area within an editor. Where a single editor edits a certain data item, the association of the data item with another data item may be identified with a specific editing area. In this case, the type of the editing area identified provides a basis for determining specific users who are authorized to edit the data item.

BRIEF DESCRIPTION OF THE DRAWING

FIG. 3 is a typical screen that appears on an output display of the first embodiment;

FIG. 4 is a view showing a format of a storage table held in data storage and data editing time storage;

FIGS. 5 and 6 are views indicating display screens in effect before and after operations in the first embodiment;

FIG. 7 is a flowchart showing the flow of the processing in the first embodiment;

FIG. 8 is a view showing specific contents of major processes depicted in FIG. 7;

FIG. 10 is a typical screen that appears on an output display of the second embodiment;

FIG. 13 is a view showing specific contents of major processes depicted in FIG. 12;

FIG. 17 is a group of typical screens that appear on an output display of the fourth embodiment;

FIG. 18 is a view showing a format of a storage table held in data storage and data editing editor storage;

FIG. 21 is a view showing an editor area provided according to the present invention;

FIG. 22 is a view showing a format of a storage table held in the editor-area-wise user information storage indicated in FIG. 20;

DETAILED DESCRIPTION OF THE PREFERRED EMBODIMENTS

The present invention may be outlined as follows. According to one aspect of the invention, the time of day up to which a specific body of data has been generated provides a basis for imposing restrictions on the editing of data subsequent to and associated with that body of data. This makes it possible to maintain the consistency of the data serving as a basis for generating other data associated therewith.

According to another aspect of the invention, the history of operations on data is stored so as to provide a basis for imposing restrictions on the updating of those data that may have influenced other data through reference or duplication. The editing of any of the influencing data is allowed or rejected, or the duplication thereof is directed at a certain destination, based on whether the data has been referenced or duplicated in the past. In this manner, any inadvertent alteration of data items without regard to their associated data is prevented, and the consistency of the data involved is maintained.

According to still another aspect of the invention, where a dedicated editor is provided to edit those data associated with other data and where the data items edited thereby are handled by any other editor, the type of the latter editor is stored. Based on the editor type, restrictions are placed on the updating of the data items that were edited by the dedicated editor. This prevents inadvertent updating of the data associated with other data without respect to the association, thereby maintaining the consistency of the data.

According to yet another aspect of the present invention, the user is allowed to access and edit given data depending on which editing area has been used within each editor in question. Permission to edit data in a given editing area is given to only those users who recognize the association that exists between the target data and other data. In this manner, users who are unaware of the association are barred from making unauthorized update of the data, and the consistency of the data is maintained.

Preferred embodiments of the present invention will now be described in detail by referring to the accompanying drawings.

Figure 2:
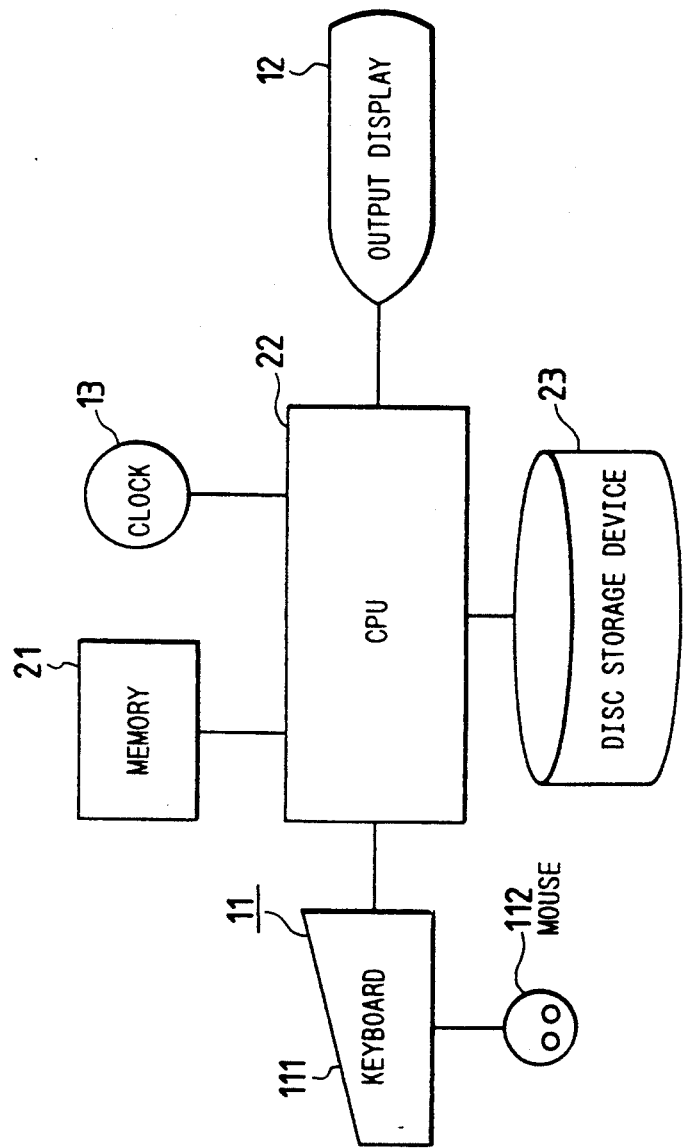
FIG. 2 is a hardware configuration diagram of the first embodiment.

FIG. 2 shows a hardware configuration of the first embodiment of the present invention. In this figure, reference numeral 11 is a keyboard equipped with a mouse; numeral 21 is a memory containing the program of the currently running editor, data items being edited, and the time of day at which each data item is edited; numeral 13 is a clock which transmits the current time to a CPU 22 in response to a request therefrom; numeral 12 is an output display on which appear the data to be edited, messages prompting editing operations and other indications; numeral 23 is a hard disc drive (disc storage device) storing data to be edited and other program resources; and numeral 22 is a CPU that controls the hardware operation and program execution.

Figure 1:
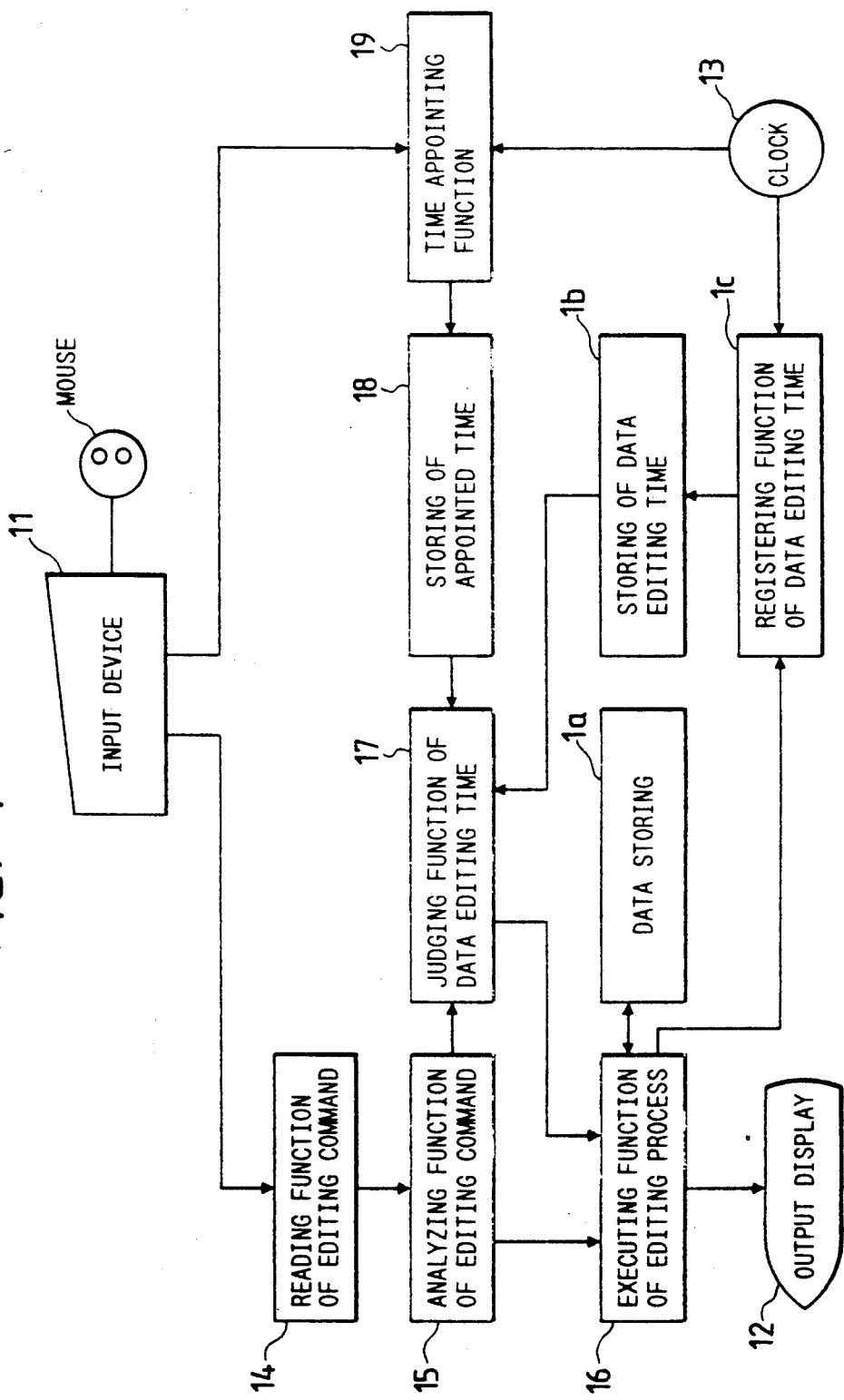
FIG. 1 is a functional block diagram of a first embodiment of the present invention.

FIG. 1 is a functional block diagram of the first embodiment. In this figure, an editing command reading function (program) 14 reads editing commands from an input device 11. An editing command analyzing function 15 analyzes the editing command read by the editing command reading function 14, identifies the type of operation (insert, delete, change, etc.) designated thereby, and acquires the necessary data accordingly. A data editing time judging function 17 reads from a data editing time storage 1b the time at which the target data obtained by the editing command analyzing function 15 was last edited. Then the function 17 judges whether the retrieved time comes before or after an appointed time stored in an appointed time storage 18. Each time of day held in the appointed time storage 18 is designated by a time appointing function 19. The time appointing function 19 reads from the clock 13 the time of day entered by the user or the time in effect when the user gives a certain instruction.

An editing process executing function 16 designates an editing process based on the editing type identified by the editing command analyzing function 15 as well as on the results of judgment by the data editing time judging function 17. According to the editing process, the editing process executing function 16 edits the data stored in a data storage 1a, displays the results thereof on the output display 12, and starts a data editing time registering function 1c. The data storage 1a contains the data to be edited. The data editing time registering function 1c reads from the clock 13 the time of day at which the data edited by the editing process executing function 16 was last updated, and enters the time into the data editing time storage 1b. In turn, the data editing time stage 1b matches with each data item the data editing time passed on from the data editing time registering function 1c.

FIG. 3 depicts a typical screen that appears on the output display 12 of the first embodiment of the invention. This screen shows part of a module specification which is a variation of software specification. In this module specification, the name, type, contents and process regarding each of the modules and variables involved are data items to be edited. Each of these items is matched with target data and a storage table containing editing times, as illustratively shown in FIG. 4. These resources are stored in the data storage 1a and data editing time storage 1b. In this example, each line of the module specification is matched with the editing time of the corresponding data.

An editing time is made up of a year, a month, a day, hours, minutes and seconds, with two digits to each time division in a 12-digit format. A year designation comes first in the format shown. An undefined data column contains the highest 12-digit number "999999999999." Likewise, the appointed time storage 18 holds 12-digit numbers designated by the time appointing function 19. With the time appointing function 19, the user may designate a desired time in one of two ways. One way is for the user to designate a desired time of day using numerals. The other way is to have the time appointing function 19 designate the current time of day in effect on the clock 13 when the user gives a certain instruction. In either way, the appointed time is represented in the 12-digit format.

The data editing time judging function 17 retrieves from the table in FIG. 4 a 12-digit number that corresponds to the target data obtained by the editing command analyzing function 15, and compares the number with the value stored in the appointed time storage 18. If the 12-digit number is smaller than that contained in the appointed time storage 18, the retrieved time is earlier than the appointed time. Otherwise the retrieved time is later than the appointed time.

FIGS. 5 and 6 depict typical screens for editing operations and the processes thereof in effect when the data editing time is as shown in FIG. 4, with the appointed time being "880611150000." In FIG. 5, an operation of changing the type of variable 'x' is carried out. In response, the data editing time judging function 17 compares the data editing time "880611093521" with the appointed time "880611150000" by means of the editing command reading function 14 and editing command analyzing function 15. In this case, the data editing time is earlier than the appointed time. Thus the editing process executing function 16 outputs a message "Only duplication is allowed to the data," and no change is made in the data. In FIG. 6, likewise, the data editing time judging function 17 compares the data editing time "880613131136" for variable 's1', the target to be changed, with the appointed time. In this case, the data editing time is later than the appointed time. Thus the editing process executing function 16 outputs a message "Input the data," and reads and accepts the changed data. This is one of the characteristics of the present invention: the ability to permit different types of editing depending on the editing time of the target data.

FIG. 7 is a flowchart showing how the processes of the first embodiment flow. In step 71, a user-entered editing command is read by the editing command reading function 14. In step 72, the command thus entered is analyzed by the editing command analyzing function 15 to identify the target data and the type of editing required. In step 73, the editing time of the target data obtained in step 72 is retrieved from the table which, shown in FIG. 4, is held by the data editing time storage 1b.

In step 74, the data editing time judging function 17 judges whether the data editing time gained in step 73 is earlier or later than the appointed time stored in the appointed time storage 18. If the data editing time is later than the appointed time, step 75 is reached; otherwise step 76 is reached. In step 75, an editing process A is performed depending on the type of editing found in step 72. In step 76, an editing process B is performed depending also on the type of editing found in step 72. Illustratively, the editing processes A and B are those performed by the editing process executing function 16 in response to editing operations, as depicted in the table of FIG. 8.

In step 77, a check is made to see if the data stored in the data storage 1a were changed by the editing process A or B. If any change is detected, step 78 is reached. In step 78, the data editing time held in the data editing time storage 1b is replaced by the current time. The above-described series of processes is repeated every time a user enters an editing command.

FIG. 8 illustratively shows specific contents of editing done by the editing processes A and B in steps 75 and 76. With the editing process A in this example, the data editing time is later than the appointed time. During the process A, ordinary editing is performed on the data. During the process B, where the data editing time is earlier than the appointed time, the contents of editing are restricted so that the data will not be changed. For example, while data may be deleted if so desired in the process A, an attempt to delete data is inhibited in the process B, with a message "Only duplication is allowed to the data" being displayed. In this manner, all attempts to change the data edited prior to a specific time are suppressed so as to protect the data.

In the example cited above, it is impossible to change any data edited prior to an appointed time. Where it is specifically necessary to change any of such data, there are a number of ways to accomplish this. One way is for the system to ask the user whether it is all right to change the data in question. Another way is to change the data and retain the contents of the editing at the same time. Retaining the contents of the edited data is equivalent to retaining the history of data changes after the appointed time. For example, where the time at which a data item is printed or duplicated is regarded as the appointed time, it is possible to make clear the difference between the printed or duplicated data item and the most recent data item. It is also possible to restore the state that the data item was in before the editing.

There are a number of features that may be provided to enhance the user-friendliness of the system. In one example where data are displayed on the output screen 12 upon triggering of an editor or during data editing, the data display color may be changed depending on the results of judgment by the data editing time judging function 17. In another example where an editing command is entered, an editing command menu is displayed following designation of the data to be edited. From this menu, the user may designate and enter a desired command. In this case, the command menu to be displayed may be changed or only those commands that are used may be displayed depending on the results of judgment by the data editing time judging function 17.

The first embodiment of the present invention described above is particularly effective for editing drawings that define software specifications. In most cases, developing software involves defining first a set of specifications common to all or part of the entire program envisaged. Based on these common specifications, the other parts of the program are defined in detail. If any part of the common specifications is changed at any subsequent stage of defining details of the other parts without regard to the influence that such change may have on the remaining parts, inconsistencies will develop in the specifications. This constitutes one of the most common causes for faulty software performance. By adopting the method of the first embodiment described above, i.e., by regarding as the appointed time the time at which the common specifications were finalized, it is possible to prevent inadvertent alteration of those specifications that provide the common basis for software development.

In the first embodiment described above, the user directly designates an appointed time. Another way to designate the appointed time is to have the computer system automatically detect and regard as the appointed time the time at which the target data were printed, checked or otherwise edited. In this manner, the user need not designate consciously the appointed time. This eliminates the possibility of the user forgetting to designate an appointed time. In the above-described embodiment, the appointed time is either in the present or in the past. Alternatively, the appointed time may be placed in the future. That is, all attempts to update, reference, duplicate or otherwise edit a certain body of data are suppressed up to a certain appointed time in future. This prevents inconsistencies in specifications which may develop as a result of references to those parts of specifications that are yet to be finalized.

Figure 9:
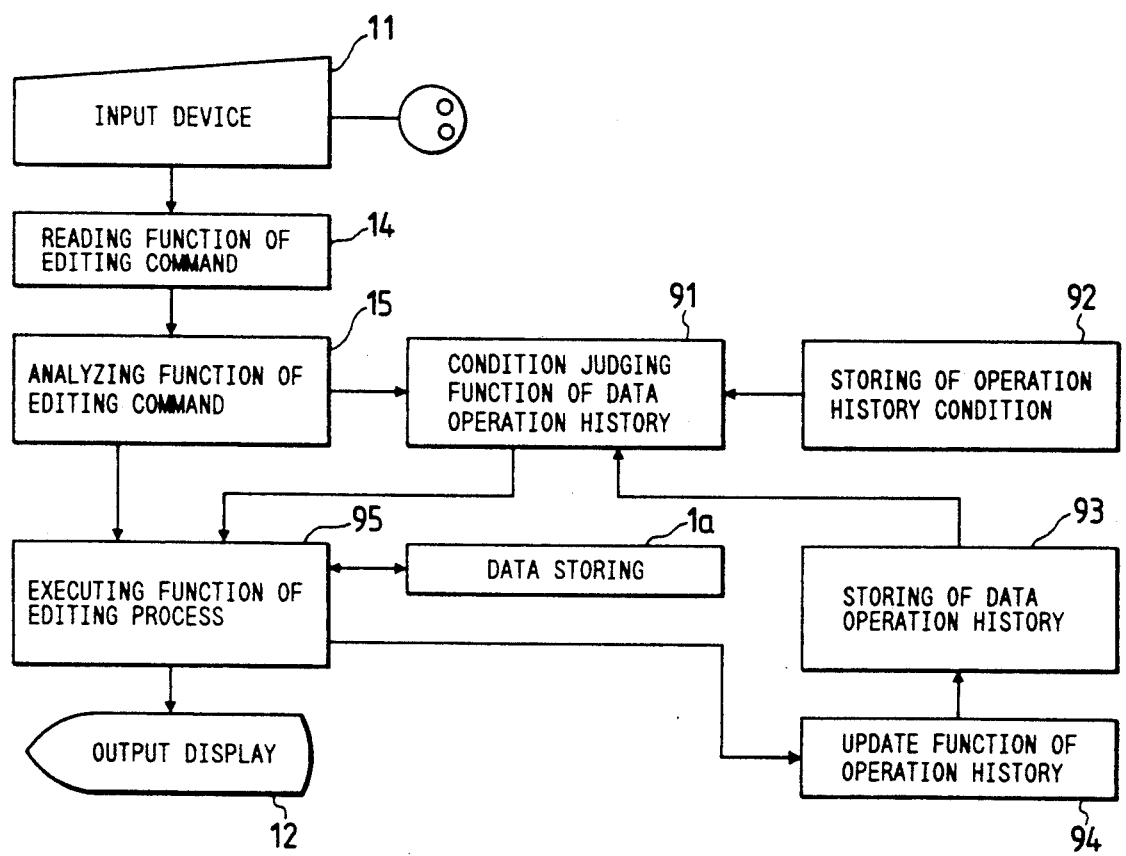
FIG. 9 is a functional block diagram of a second embodiment of the present invention.

FIG. 9 is a functional block diagram of the second embodiment of the present invention. The diagram shows a setup for determining how an editing command is to be processed not according to the editing time but in reference to the history of editing operations on data. In the figure, the input device 11, output display 12, editing command reading function 15, editing command analyzing function 15, and data storage 1a are the same as in FIG. 1. A data operation history condition judging function 91 acquires, from a data operation history storage 93, the history of editing operations on the target data identified by the editing command analyzing function 15. The function 91 then judges whether the acquired history meets the condition stored in an operation history condition storage 92.

An editing process executing function 95 determines the editing process based on the contents of editing identified by the editing command analyzing function 15 and on the results of judgment by the data operation history condition judging function 91. According to the editing process thus selected, the function 95 edits the data stored in the data storage 1a, outputs the results thereof to the output display 12, and starts an operation history update function 94. The function 94 in turn transfers to the data operation history storage 93 the data updated by the editing process executing function 95 or the contents of editing operations on the displayed data. The operation history update function 94 then matches with the target data the contents of the editing operations transferred from the operation history update function 94 so as to arrange the target data in the order in which the editing operations took place.

Figure 11:
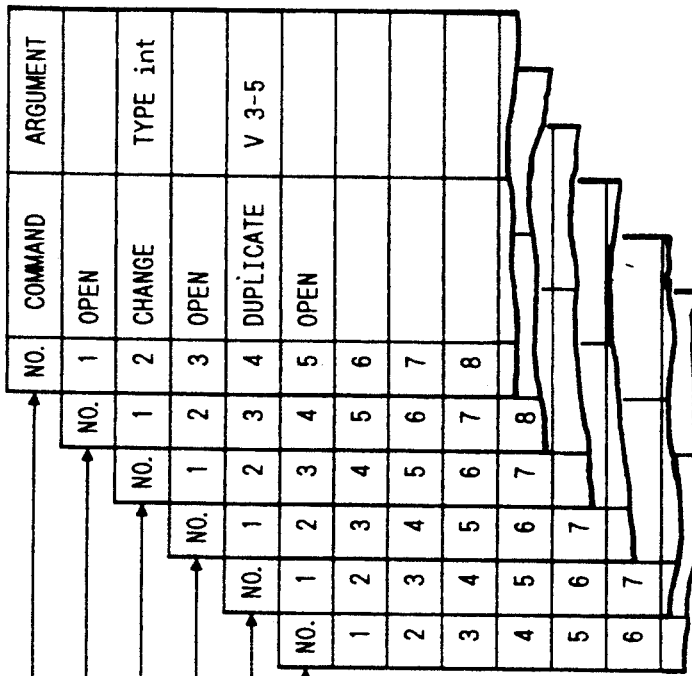
FIG. 11 is a view indicating a format of a storage table held in data storage and data operation history storage.

FIG. 10 shows a typical screen that appears on the output display 12 in the second embodiment. In this example, a table specification which is a variation of software specification is edited. For this table specification, the name, type and contents of each table, variable, or element thereof are data items to be edited. These data items and the storage tables to accommodate the operation history thereof are arranged as shown in FIG. 11. The data storage 1a and data operation history storage 93 are involved in this arrangement. In the figure, each line of the table specification is matched with the operation history of the data corresponding to that line.

The operation history illustratively includes editing command names such as "Change" and "Duplicate" entered after data insertion for display or change, and arguments which represent changed data, destinations of duplication and other information on the commands involved. Each duplication destination is stored in the form of an identifier representing the number of the corresponding drawing and the location of duplication therein. The entry "Open" in the "Command" column is a command name by which to trigger an editor onto a specification. The command causes the specification-related data to be displayed.

Thus the editing commands referred to above include the editor triggering command "Open." Once an editor is triggered by the "Open" command, this command is added to the operation history of all data that appear on the screen upon triggering of the editor. The operation history condition held in the operation history condition storage 92 is a condition that asks, for example, whether the operation history contains an "Open" or "Duplicate" entry. If the "Open" entry exists, that means the applicable data item has been referenced after data insertion; if the "Duplicate" entry exists, that means the applicable data item has been duplicated somewhere else after data insertion.

Figure 12:
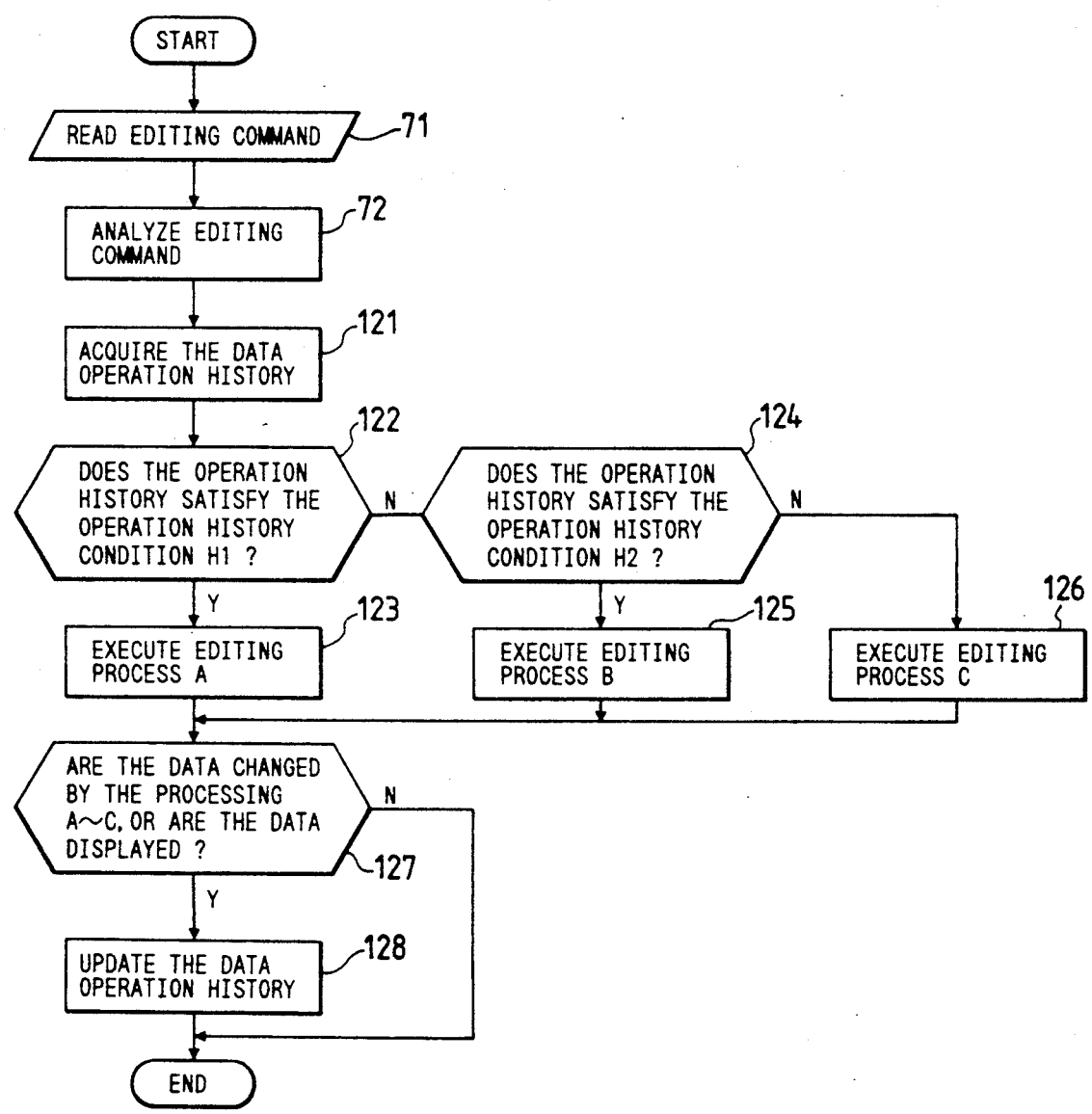
FIG. 12 is a flowchart showing the flow of the processing in the second embodiment.

FIG. 12 is a flowchart showing how the processes of the second embodiment flow. Steps 71 and 72 are the same as in FIG. 7. In steps 121, the data operation history of the target data acquired in step 72 is obtained from the table which, illustratively shown in FIG. 11, is stored in the data operation history storage 93. In step 122, a check is made to see if the data operation history obtained in step 121 by the data operation history condition judging function 91 meets a first operation history condition (H1) held in the operation history condition storage 92. If the condition is met, step 123 is reached; otherwise step 124 is reached.

In step 124, a check is made to see if the data operation history gained in step 121 meets a second operation history condition (H2) held in the operation history condition storage 92. If the history meets the condition, step 125 is reached; otherwise step 126 is reached. In this example, it is assumed that the operation history condition H1 is met if the operation history does not contain any "Open" entry, and that the operation history condition H2 is met if the operation history does not contain any "Duplicate" entry. In step 123, the editing process A is performed depending on the contents of editing identified in step 72. In step 125, the editing process B is carried out depending also on the contents of editing identified in step 72. In step 126, the editing process C is conducted depending on the contents of editing identified in step 72. The editing processes A, B and C are the processes performed by the editing process executing function 95 in response to given editing operations, as shown illustratively in FIG. 13.

In step 127, a check is made to see if any data item stored in the data storage 1a has been changed by the editing process A, B or C, or if any data item is displayed on the output display 12. Where there is any data item that has been changed or is being displayed, step 128 is reached. In step 128, the contents of the operation that has just been performed by the operation history update function 94 are added to the data operation history stored in the data operation history storage 93. The above series of processes is repeated every time a user inputs an editing command into the system.

FIG. 13 shows an example of specific contents of the editing processes A, B and C that are carried out in steps 123 and 125. The editing details not shown in this table are common to the three processes A, B and C. In this example, where a data item to be edited has already been referenced or duplicated somewhere else, that data item is barred from any update. This keeps discrepancies from developing between the original data and the data created by reference thereto or by duplication thereof. The editing process B or C may accommodate the functional variations added to the editing process B of the first embodiment. The editing process C also accommodates a capability of displaying duplication destinations of data as well as a capability of updating both an original data item and its counterpart at a duplication destination. The latter capability is especially effective for maintaining the consistency between the original and the duplicated data.

In the second embodiment described above, the data operation history is supposed to be kept supplemented with all operations after data insertion unless and until the data item in question is deleted. In practice, however, memory constraints make such a scheme unrealistic. Instead, the operation history may be automatically cleared when, illustratively, a data consistency check is carried out or data items are printed. This makes it possible to clear the operation history as soon as the common specifications of, say, software have been finalized. There is no need to impose unnecessary constraints on the referenced or duplicated data before the specifications are finalized. Only after the specifications are finalized should the referenced or duplicated data alone be protected.

In the above-described second embodiment, the history of editing operations may be supplemented with information identifying which user carried out which operation. This provides further protection of data based on yet another criterion. Below is a third embodiment of the invention in which is shown an example of adding user identification information to the editing operation history.

Figure 14:
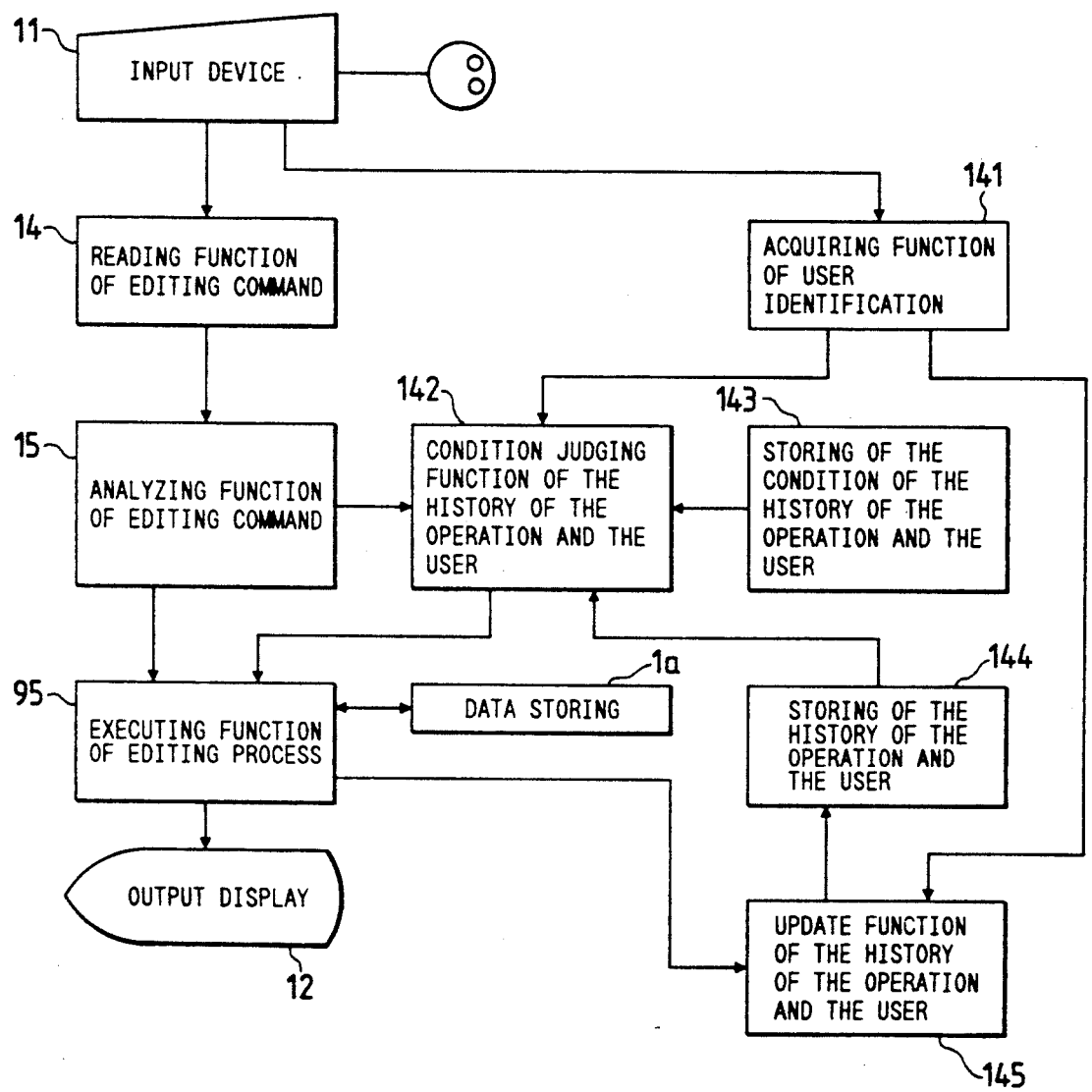
FIG. 14 is a functional block diagram of a third embodiment of the present invention.

FIG. 14 is a functional block diagram of the third embodiment. In the figure, the input device 11, output display 12, editing command reading function 14, editing command analyzing function 15, editing process executing function 95, and data storage 1a are the same as in FIG. 9. A user identification information acquiring function 141 reads and stores user identification information entered by each user.

An operation/user history condition judging function 142 acquires, from an operation/user history storage 144, the history of editing operations on the target data and of the users who performed these operations. The function 142 then identifies the user who is currently editing the data through the user identification information acquiring function 141, and checks to see if the relationship between the current user and the previous user meets the condition stored in an operation/user history condition storage 143. The editing process executing function 95 determines the editing process based on the contents of editing identified by the editing command analyzing function 15 and on the results of judgment by the operation/user history condition judging function 142. According to the editing process thus selected, the editing process executing function 95 edits the applicable data stored in the data storage 1a, displays the edited results onto the output display 12, and starts an operation/user history update function 145.

The operation/user history update function 145 transfers, to the operation/user history storage 144, the contents of editing operations corresponding to the data changed or displayed by the editing process executing function 95 as well as the identification information about the user who carried out the editing operations. In turn, the operation/user history storage 144 matches with the data to be edited the information transferred from the operation/user history update function 145, and stores the information in the order in which the editing operations were carried out.

In this manner, both the current user and the preceding user who performed a given editing operation in the past are identified. Thus the operation/user history condition judging function 142 checks to see if the data item to be edited has been referenced or duplicated by someone other than the current user. If the data item has already been referenced or duplicated, the editing process B or C of FIG. 13 is carried out; otherwise the editing process A is performed. This constitutes an editing supporting function whereby the current user about to update a data item is barred from doing so if the data item may have influenced other data. That is, the current user is allowed to change any data item only if the scope of influence thereof is clearly understood and found conducive to update.

The operation/user history condition judging function 142 checks to see if the data item to be edited was first inserted by someone other than the current user. If the preceding user is different from the current user, measures may be taken to keep the data item unchanged. This allows the user who first set data to protect them from inadvertent update by other users without his knowledge. When software specifications are to be edited without such protective measures, there occur many cases where data items created by one data designer are changed by other designers who are aware of only one aspect of these items. This results in frequent discrepancies between the original data and the associated items derived therefrom. These discrepancies are prevented by providing the above-described measures for barring any other user than the one who first inserted data from updating them.

Besides performing the editing processes indicated in FIG. 13, the editing process executing function 95 allows the current user who edits the target data referenced or duplicated by other users to change the data in the editing process B or C, on condition that each user who referenced or duplicated a given data item may be indicated on the display, or may be informed by mail or other means of the updated contents. In such cases, it is possible to notify the changed contents to any user who knows the scope of influence of the target data. Alternatively, it is also possible to ask the user about the specific items that are changed. This makes it possible, upon updating of a data item, to change all items associated therewith. This arrangement allows the data referenced by other users to be changed while maintaining the consistency of the entire data structure.

In preparing software specifications, different designers are often assigned different parts of the whole structure. This results in frequent discrepancies between data handled by different designers. In the above-described third embodiment of the invention, the user identification information helps to minimize mismatches in specifications between designers.

Figure 15:
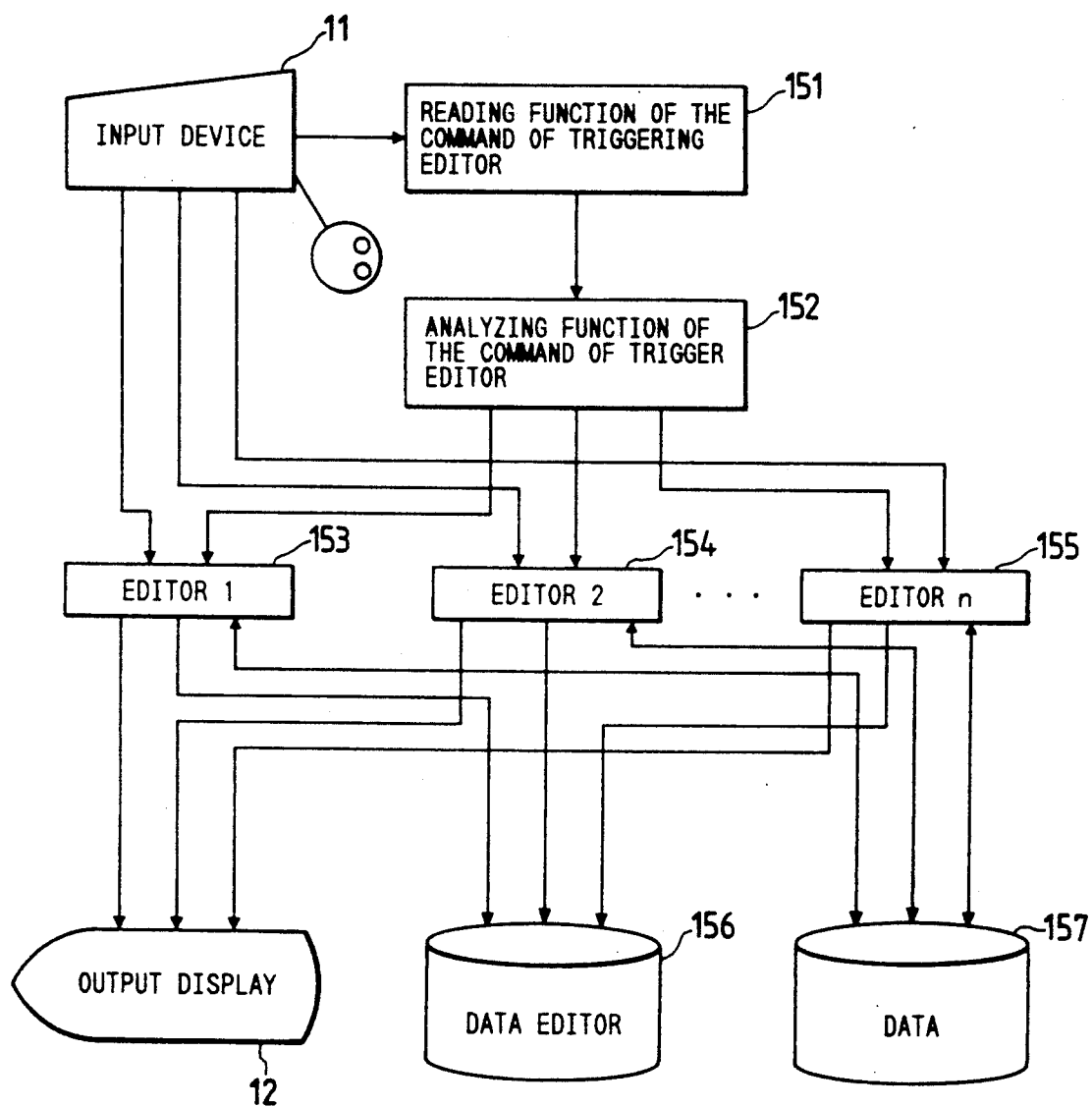
FIG. 15 is a functional block diagram of a fourth embodiment of the present invention.

FIG. 15 is a functional block diagram of the fourth embodiment of the present invention. In this environment where target data items are edited by a plurality of editors, the editing process for a given editing command is determined based on which editor previously edited the target data. An editor triggering command is entered through the input device 11. An editor triggering command reading function 151 reads the command which in turn is analyzed by an editor triggering command analyzing function 152. Depending on the results of the analysis, one of the editors E1 through En is triggered as designated by the command. The editor displays the target data onto the output display 12 and edits a data file 157. At the same time, editor identification information is placed in a data editor file 156. This information identifies the type of the editor selected from among the editors E1 through En to edit the target data (called the data editor).

Figure 16:
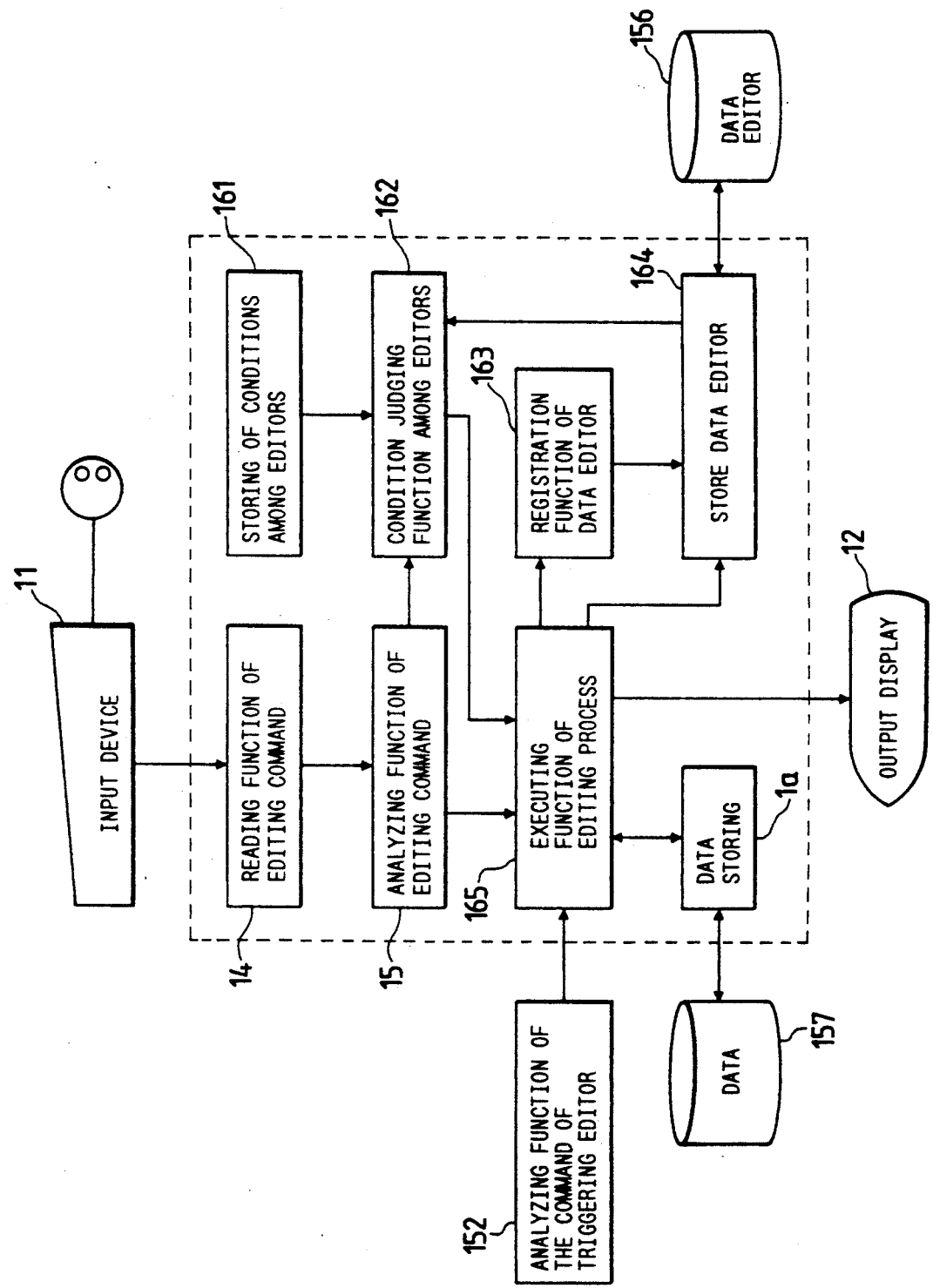
FIG. 16 is a functional block diagram showing details of how the editors depicted in FIG. 15 work.

FIG. 16 is a functional block diagram illustrating the functions of each editor in detail. Specifically, the portion enclosed by broken lines constitutes the functional blocks common to all editors E1 through En. In the figure, the editing command reading function 14 and editing command analyzing function 15 are the same as in FIG. 1. When the editing process executing functions 165 gives an order to read data, the data storage 1a reads and stores the data from the data file 157. When the editing process executing function 165 gives an order to store data, the data storage 1a places the data into the data file 157.

An inter-editor condition storage 161 stores a condition that may exist between the currently running editor and the data editor that previously edited the target data. An inter-editor condition judging function 162 acquires, from a data editor storage 164, the data editor which was identified by the editing command analyzing function and which previously edited the target data. The function 162 then checks to see if the relationship between the acquired editor and the currently running editor meets the condition stored in the inter-editor condition storage 161.

The editor process executing function 165 determines the editing process based on the contents of editing identified by the editing command analyzing function 15 and on the results of judgment by the inter-editor condition judging function 162. According to the editing process thus selected, the editing process executing function 165 edits the data stored in the data storage 1a, outputs the edited results onto the output display 12, and starts a data editor registration function 163. When an order to trigger an editor is issued, the information about the designated data and the information about the data editor corresponding thereto are read into the data storage 1a and the data editor storage 164, respectively.

When any data item is inserted or changed by the editing process executing function 165, the data editor registration function 163 matches with the data item the editor that carried out the editing process, and stores the editor name in the data editor storage 164. When the editing process executing function 165 issues an order to read data, the data editor storage 164 reads and stores, from the data editor file 156, the information about the data editor corresponding to the target data. When the editing process executing function 165 issues an order to store data, the data editor storage 164 places the data editor information in the data editor file 156.

FIG. 17 shows typical screens that appear on the output displays 12 of the fourth embodiment of the invention. The screens shown relate to the editors E1, E2 and E3. In this example, the editor E1 handles a table specification which is a variation of software specification; the editor E2 deals with an internal data definition diagram, another variation of software specification; and the editor E3 addresses a module specification, still another variation of software specification. In the "Variable" column of the module specification, the same data edited in the table specification and internal data definition diagrams may be edited.

The slash-shaded portion in the "Variable" column of the module specification comprises the data edited in the table specification, and the mesh-shaded portion therein comprises the data edited within the internal data definition diagram. FIG. 18 depicts an example, in this state, of the data which are in effect upon triggering of editors onto the module specification and which are found in the data storage 1a and data editor storage 164, along with a storage table example for the data editor. In this figure, each line of the module specification is matched with the name of the editor that edited the data corresponding to that line.

Figure 19:
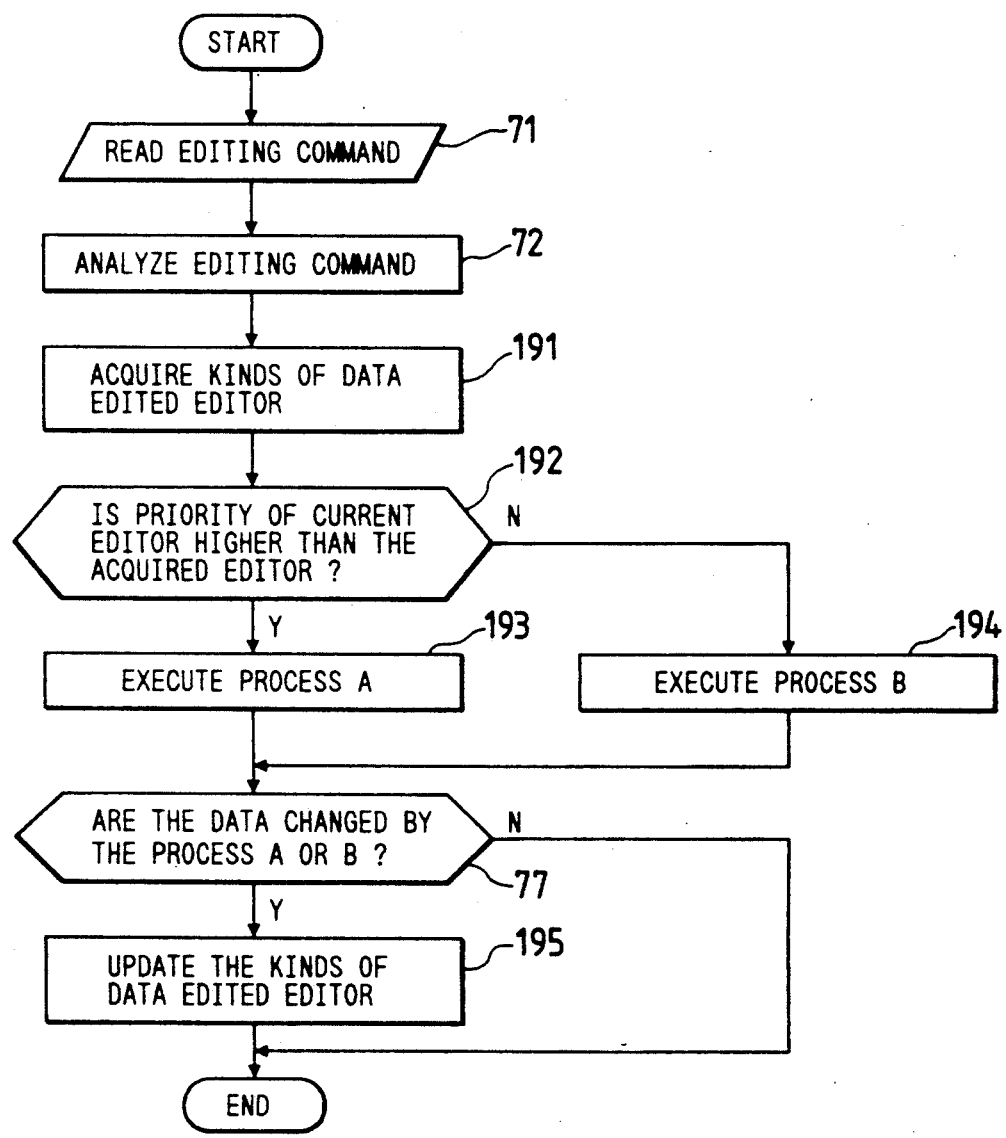
FIG. 19 is a flowchart showing the flow of the processing in the fourth embodiment.

FIG. 19 is a flowchart illustrating the flow of the processes in the fourth embodiment of the invention. Steps 71 and 72 are the same as in FIG. 7. In step 191, the data editor corresponding to the target data obtained in step 72 is acquired from the table which, illustratively shown in FIG. 18 is contained in the data editor storage 164. In step 192, the inter-editor condition judging function 162 checks to see if the data editor thus acquired meets the condition stored in the inter-editor condition storage 161. In this example, a check is made to see if the editor acquired in step 191 has a higher editing priority than the currently running editor. If the condition is met, step 193 is reached; otherwise step 194 is reached.

In step 193, the editing process A is performed in accordance with the contents of editing identified in step 72. In step 194, the editing process B is performed also according to the contents of editing identified in step 72. The editing process A is illustratively equivalent to the editing process A shown in FIG. 8. The editing process B is such that an attempt to change a data item is met by a message "Edit this data item with editor i" while other operations are serviced the same way as in the editing process A. The editor 'i' is the name of an editor having a higher editing priority than the current editor. In the editing process B, an attempt to duplicate a data item may be accompanied by a system operation whereby the data editor for source data is registered as the data editor for duplicated data. This allows the target data item for duplication to inherit the inserted or changed editor type for consistency.

In step 77, a check is made in the editing process A or B to see if any data item in the data storage 1a has been changed. If any change in data exists, step 195 is reached. In step 195, the data editor stored in the data editor storage 164 is replaced by the currently running editor. The above series of processes is repeated every time a user inputs an editing command.

In the above-described embodiment, the condition for the inter-editor condition judging function 162 to judge is whether the currently running editor has a higher editing priority than the editor that previously edited the target data. Alternatively, a check is made to see if the currently running editor is the same as the preceding editor with respect to the target data. Yet another alternative is to establish different conditions for different editors, each currently running editor being judged for the condition applicable thereto.

In FIG. 17, the variables defined in the table specification are data common to a plurality of modules, while the variables defined in the internal data definition diagram are data for use by one module alone. One module specification is prepared for each module. In it are described the name of the module, the definitions of the variables used thereby, and the processes related thereto. In designing a software product by use of these specifications, the table specification is primarily referenced in order to create individual module specifications.

In may cases, the designer of one module may arbitrarily change a common specification to accommodate some requirements of his module, causing discrepancies with other specifications. If the method of the fourth embodiment of the invention is used, the editor for the table specification may be given a higher priority than the editor for any module specification. This prevents changes from occurring to the table specification common to individual module specifications. Thus it is possible to remove discrepancies between modules in terms of the table specification. An additional feature is to restrict the users who may access editors that edit data items affecting other data. Yet another feature is to display the destination of the data duplicated to any other specification. These measures keep unauthorized users from unknowingly changing common data, and prevent omitting associated data items that should be changed whenever any common data item is updated.

What follows is a description of the fifth embodiment of the present invention. This embodiment involves dividing each editor into a plurality of areas, each area being assigned a condition about the user who is allowed to edit that area. An editing process is permitted or suppressed depending on whether that condition is met.

Figure 20:
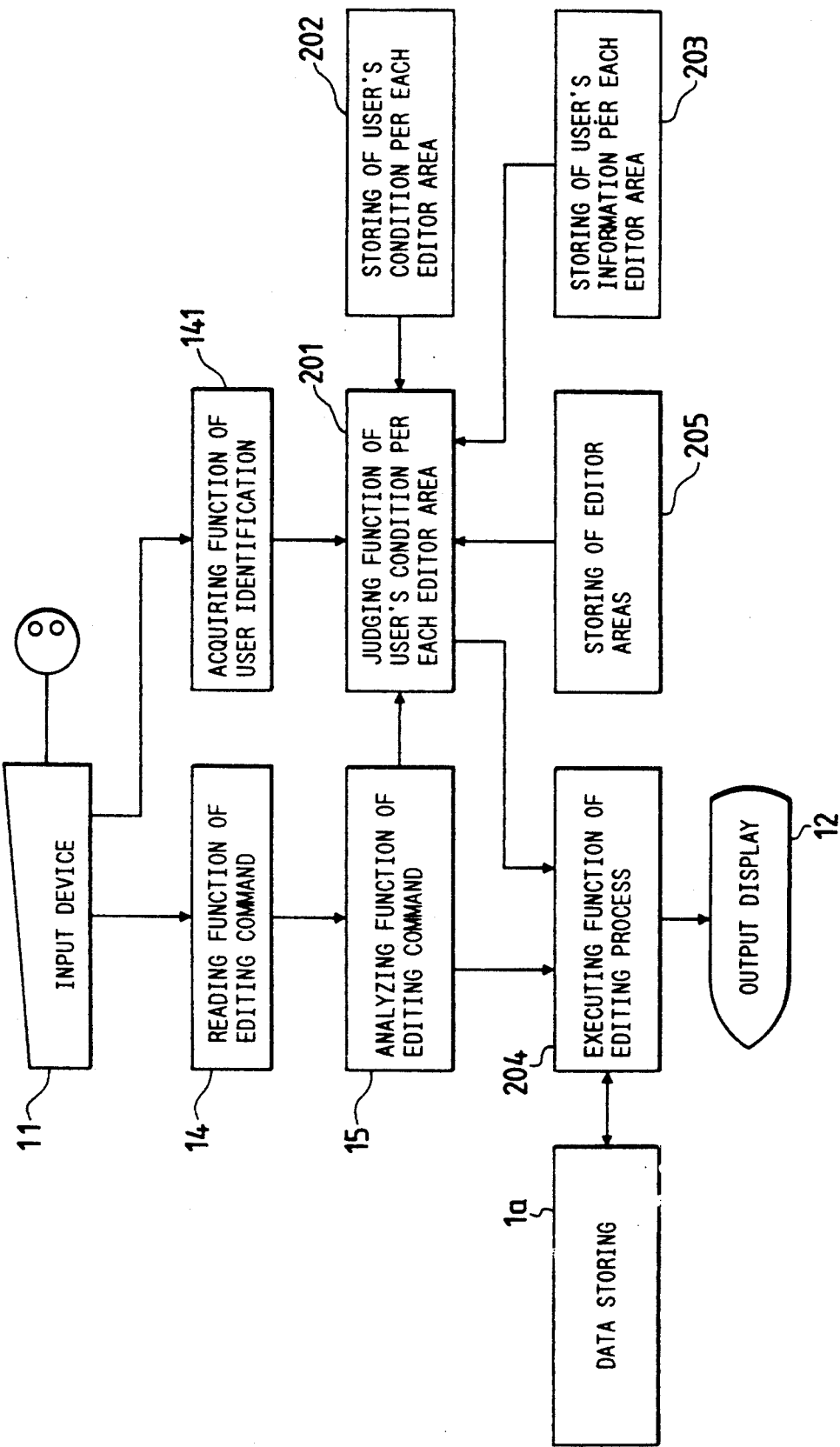
FIG. 20 is a functional block diagram of a fifth embodiment of the present invention.

FIG. 20 is a functional block diagram of the fifth embodiment of the invention. In the figure, the editing command reading function 14, editing command analyzing function 15, and data storage 1a are the same as in FIG. 1, and the user identification information acquiring function 141 is the same as in FIG. 14. An editor-area-wise user condition storage 202 stores the condition that exists between the currently editing user's area and the target area to be edited by a user whose name is held in an editor-area-wise user information storage 203. An editor-area-wise user condition judging function 201 acquires the information identifying the currently editing user through the user information acquiring function 141. The area to which is assigned the target data item obtained by the editing command analyzing function 15 is acquired from an editor area storage 205. With respect to the area thus selected, the corresponding user identification information is acquired from the editor-area-wise user information storage 203. Then a check is made to see if the relationship between the two kinds of user identification information meets the condition held in the editor-area-wise user condition storage 202.

The editing process executing function 204 determines the editing process based on the contents of editing identified by the editing command analyzing function 15 and on the results of judgment by the editor-area-wise user condition judging function 201. According to the editing process thus selected, the data items held in the data storage 1a are edited and displayed on the output display 12. The editor area storage 205 stores the areas within each editor versus the data related thereto. The editor-area-wise user information storage 203 stores user identification information in accordance with these areas within each editor.

FIG. 21 illustrates how the target data items stored in the editor area storage 205 are related to the editor areas. This figure shows an example of an editor for a module specification. The name of the module edited by this editor, definitions of input/output data, and definitions and processes of internal data are set up as different areas.

FIG. 22 depicts how the areas stored in the editor-area-wise user information storage 203 are related to individual users. In this example, one area is assigned information identifying one user. Alternatively, one area may be assigned information identifying a plurality of users or information identifying a group comprising a plurality of users.

Figure 23:
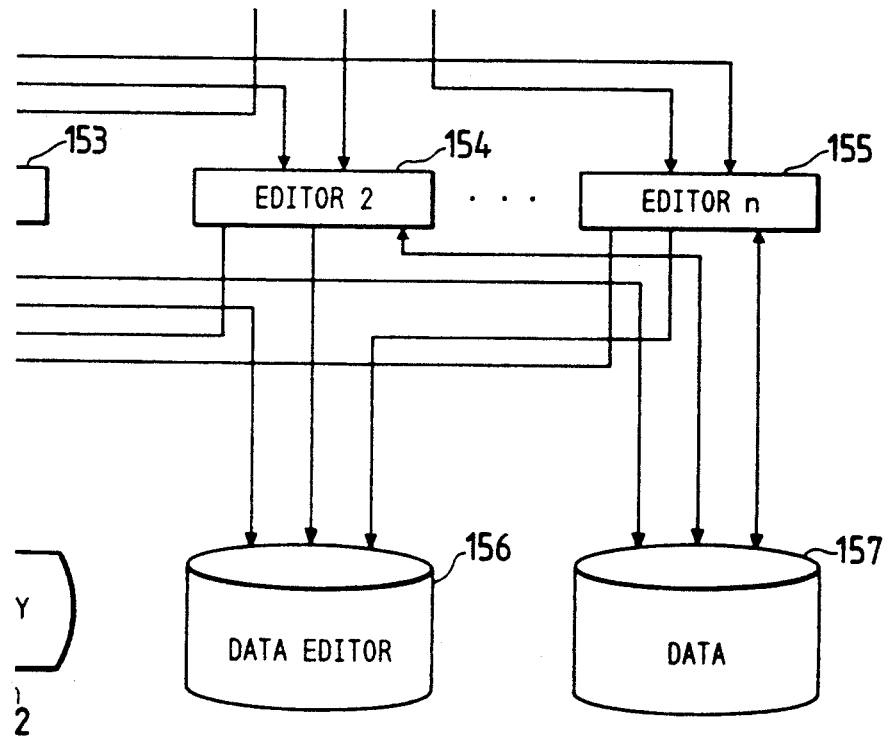
FIG. 23 is a flowchart showing the flow of the processing in the fifth embodiment.

FIG. 23 is a flowchart showing the flow of the processes in the fifth embodiment of the invention. Steps 71 and 72 are the same as in FIG. 7. In step 231, a check is made to see to which area of the editor the target data item obtained in step 72 belongs through the use of the editor area storage 205. In step 232, the user identification information corresponding to the area obtained in step 231 is acquired from the table which, illustratively shown in FIG. 22, is held in the editor-area-wise user identification information storage 203. In step 233, a check is made to see if the condition stored in the editor-area-wise user condition storage 202 is met by the user identification information obtained in step 232 on the one hand, and by the information identifying the currently editing user on the other. The latter user identification information is acquired by the user identification information acquiring function 141.

An example of a judgment over a user-area-wise user condition involves checking to see if the currently editing user is the same as the user identified in step 232. Another example involves checking to see if, with all users assigned their respective editing priorities, the currently editing user has a higher priority than the user identified in step 232. If the results of the judgement in step 233 indicate that the condition is met, step 234 is reached; otherwise step 235 is reached. In step 234, the editing process A is performed in accordance with the contents of editing identified in step 72. In step 235, the editing process B is carried out according to the contents of editing identified in step 72. The editing processes A and B are illustratively shown in FIG. 8.

The above-described processing is repeated every time a user inputs an editing command. In the editor-area-wise user information storage 203 of this fifth embodiment, two groups of areas are provided. One group of areas, in which to store the names of modules affecting the specifications of other modules and in which to edit the definitions of input/output data, contains the information identifying the users who recognize the scope of influence of the data involved. The other group of areas, in which to edit the definitions and processes of internal data, contains the information identifying the user in charge of each module. This arrangement makes it possible to prevent one user, who understands and is in charge of the specifications of a single module alone, from inadvertently changing the data that can affect other data. At the same time, no one other than the person in charge of a given module is allowed to alter the internal specifications of that module.

The five embodiments described above in reference to FIGS. 1 through 23 may be practiced singly or in combination. When suitably combined, these embodiments will provide further benefits.

Figure 24:
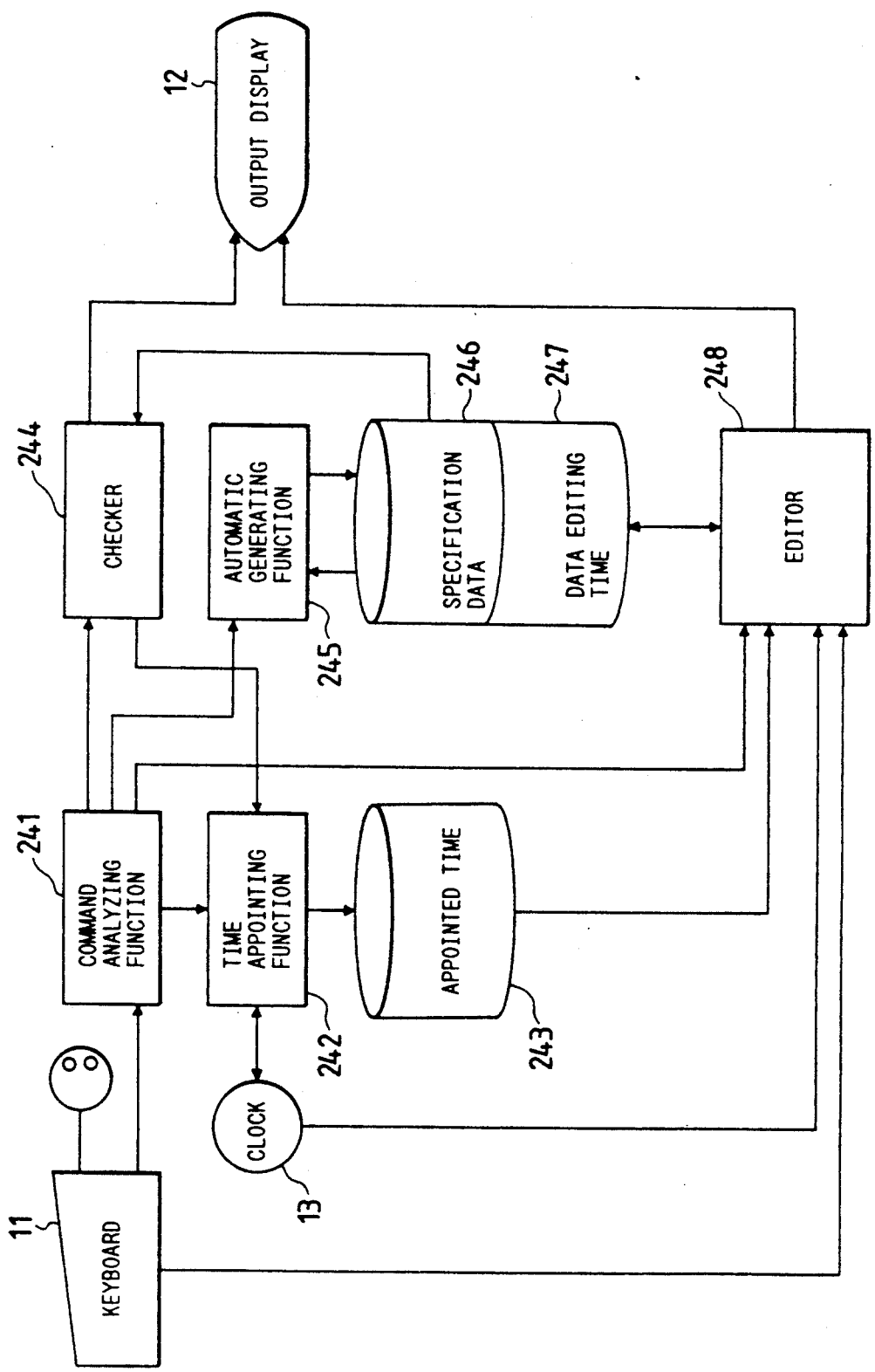
FIG. 24 a functional block diagram of a sixth embodiment of the present invention.

FIG. 24 is a functional block diagram of the sixth embodiment of the present invention. This embodiment constitutes a specification preparation system that operates on the editing supporting method according to the invention. This system comprises an editor 248, a check 244 and an automatic generating function 245. The editor 248 edits a specification data file 246 containing various specifications whose data make up a whole software system. The checker 244 checks the specification data for consistency. The automatic generating function 245 automatically generates an associated specification based on another specification. A command entered through the input device 11 is analyzed by a command analyzing function 241. If the command turns out to be a check triggering command upon analysis, the checker 244 is triggered. If the command is found to be one that designates automatic generation, the automatic generating function 245 is automatically triggered. If the analyzed command is an editor triggering command, the editor 248 is triggered.

The moment the automatic generating function 245 is triggered, a time appointing function 242 obtains the current time from the clock 13, and stores the time value in an appointed time file 243. The checker checks the consistency of data in the specification data file 246, and displays the results thereof on the output display 12. If the results of the check reveal no inconsistency, the time value at that point in time is stored in the appointed time file 243 by the time appointing function 242. Based on a command-designated specification in the specification data file 246, the automatic generating function 245 automatically generates another specification related thereto, and stores the latter in the file 246. The editor 248 reads the data of the command-designated specification from the specification data file 246, and edits the data in accordance with instructions given by the user through the input device 11. At this time, the editing support features depicted in FIGS. 1 through 8 are performed while the editing time of each data item stored in a data editing time file 247 is being compared in terms of chronological order with the corresponding appointed time held in the appointed time file 243.

In the above-described system, it is possible to restrict any change to the already generated data either at a time when the checker 244 has found the data consistent or at a time when a specification has been automatically generated based on another specification. This arrangement prevents inadvertent change to the already consistent data. The appointed time file 243 may be provided with more detailed features of edition supporting. That is, an appointed time may be assigned to each item of the data verified by the checker 244, of the source data from which another specification was automatically generated, and of the data derived from other data. Alternatively, these data items may be given a number of appointed times each so that the editing process by the editor 248 may be changed depending on individual time settings.

FIG. 24 illustrates an example of a system that operates on the editing supporting method utilizing data editing time settings. It will be apparent to those skilled in the art that the system may also be implemented by use of other embodiments of the invention, either singly or in combination.

According to the present invention, as described above, an information processing system comprising a host computer and interactive terminals may support the editing of data while specifically protecting individual data items in accordance with the condition that may vary from one editing phase to another. That is, the type of editing on data is determined by such parameters as the editing time of each data item, the history of editing operations on data, the type of editor used, and other conditions related to the editing process.

Not visible in concrete form, the relations between data items are difficult to grasp. In particular, a user tends to concentrate on the target data during editing to the exlusion of everything else, including possible association with other data not displayed. This often results in data inconsistencies which are difficult to detect. The present invention minimizes the incidence of such inconsistencies in data, boosting the reliability of edited data. Any inconsistency of data that does occur is easy to detect and correct by use of the features and benefits derived from the present invention.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A method of supporting editing data for use in an information processing system which has processor means, an interactive terminal means and a memory means, said data editing support method comprising the steps of:

storing in said memory means information about at least a prior data editing process for a data item, the prior editing process information including at least one of a time of each prior editing process and a history of editing processing performed on the data items;

referencing said memory means with the processor means to acquire at least a portion of the prior data editing process information in accordance with a target editing instruction, which target editing instruction is determined, from other instructions entered from said terminal means; and judging with the processor means whether or not said acquired data editing process information meets a certain condition in order to determine how a next data editing process should be performed on said data item.

2. In an information processing system having a processor means, interactive terminal means, a memory means, and a data, editing support system for editing data in said processor means in accordance with instructions from said terminal means, said data edition supporting system comprising:

(a) means for storing in said memory means prior editing information about a prior data editing process performed on a data item, the prior editing information including at least one of (i) a time when said data item was edited and (ii) a history of editing operations for said data item;

(a) means for referencing said memory means to acquire the prior editing information for said data item; and means for judging whether or not said acquired prior editing information meets a certain condition in order to determine how a subsequent editing process should be performed on said data item.

3. A method for editing data for use in an information processing system which has a processor means, a memory means, interactive terminal means and a clock means, said data editing method comprising with the processor means performing the steps of:

finding from said clock means an editing time at which a data item was edited;

storing the found editing time in correspondence with said data item in said memory means;

acquiring from said memory means a target editing time corresponding to a target editing data determined by instructions entered from said terminal means;

judging whether said acquired target editing time comes before or after a certain appointed time; and determining a type of editing to be performed on said data item in accordance with the judging step.

4. A data editing method according to claim 3, wherein said certain appointed time is a preselected time in any of the past, present and future.

5. A data editing method for use in an information processing system having a processor means, a memory means, and interactive terminal means, the data editing method comprising the steps of:
  storing in said memory means a history of editing operations on a data item, said history being stored in association with its corresponding data item;
  judging with the processor means whether said history meets a predetermined condition; and
  determining with the processor a type of editing to be performed on said target data item in accordance with the results of the judging step.

6. A data editing method for use in an information processing system having a processor means, the a memory means and interactive terminal means, the data editing method comprising the steps of:
  acquiring with the processor means current user information which identifies a user currently performing an editing operation on a data item;
  storing a history of the editing operation on said data item and the acquired current user information in the memory means in correspondence with said data item;
  judging with the processor means whether said history and said acquired current user information meet a certain condition in accordance with instructions entered from said terminal means; and
  determining with the processor means a type of editing on said data item in accordance with said judging step.

7. A data editing method for use in an information processing system having a processor means, a memory means, and interactive terminal means, the method comprising the steps of:
  editing a single data item with at least one of a plurality of types of editors in an environment of said terminal means;
  storing in the memory means an identification of the each type of editor which was used to edit said single data item;
  judging with the processor means whether a certain condition is met by a relationship between an identification of a currently running editor and the identification of each type of editor stored in said storing step; and
  determining with the processor means a type of editing to be performed next on said single data item in accordance with said judging step.

8. A method of editing data in an information processing system having a processor means, a memory means, and interactive terminal means, the method comprising the steps of:
  editing data with an editor that includes at least a first memory area in an environment of said terminal means;
  acquiring current user information with the processor, the current user information identifying a user who is currently editing with said editor;
  storing in the memory means other user information identifying other specific users and memory areas corresponding to the other users;
  judging with the processor means whether a certain condition is met by a relationship between the current user information and the other user information; and
  determining with the processor means a type of editing to be performed in accordance with said judging step.

9. A data editing system in an information processing system having a processor means, a memory means, interactive terminal means and a clock means, the system comprising:
  means for finding from said clock means an editing time at which a data item was edited and storing the found editing time in correspondence with said data item in said memory means;
  means for acquiring from said memory means the editing time corresponding to a target editing data determined by instructions entered from said terminal means in order to judge whether said acquired editing time comes before or after a certain appointed time; and
  means for determining a type of editing on said data item in accordance with the results of the judgment made by said acquiring means.

10. A data editing system according to claim 9, wherein said certain appointed time is a preselected time in any of the past, present and future.

11. A system of editing data in an information processing system having a processor means, a memory means, and interactive terminal means, the system comprising:
  means for storing a history of editing operations on a data item in the memory means matched with said data item;
  a judging means for judging whether said history meets a predetermined condition; and
  a means for determining a type of editing for said data item in accordance with the judging performed by said judging means.

12. A data editing system in an information processing system having a processor means, a memory means, and interactive terminal means, comprising:
  means for acquiring a current user identification which identifies a user currently performing an editing operation on a data item;
  means for storing an identification of the editing operation performed on said data item in the memory means in association with a history of acquired current user identifications;
  a means for judging whether said editing operation identification and said history meet a certain condition; and
  a means for determining a type of editing for said data item in accordance with judging means.

13. A data editing system in an information processing system having a processor means, a memory means, and interactive terminal means, comprising:
  means for editing a single data item with at least one of a plurality of editors in an environment of said terminal means;
  means for storing an indication of each editor used to edit said data item in the memory means in association with said data item;
  means for judging whether a certain condition is met by a relationship between the editor indication and indications of others of the plurality of editors; and
  means for determining a type of editing to be performed on said data item in accordance with said judging means.

14. A data editing system in an information processing system having a processor means, a memory means, and interactive terminal means, comprising:
  means for editing data including at least one memory area in an environment of said terminal means;

means for acquiring an identification of a user who is currently engaged in editing;

a means for storing identifications of specific users with respect to corresponding memory areas;

a means for judging whether a certain condition is met by a relationship between the currently editing user identification and the specific user identifications; and a means for determining a type of editing to be performed in accordance with said judging means.

* * * * *

UNITED STATES PATENT AND TRADEMARK OFFICE
CERTIFICATE OF CORRECTION

PATENT NO. : 5,216,604

DATED : June 1, 1993

INVENTOR(S) : Junko Sakata, et al.

It is certified that error appears in the above-identified patent and that said Letters Patent is hereby corrected as shown below:

Claim 1, column 16, line 8, before "processor" insert --a--.

Claim 2, column 16, line 31, after "data" delete ",".

Claim 2, column 16, lines 33-34, delete "edition supporting" and substitute therefor --editing support--.

Claim 2, column 16, lines 35 and 41, delete "(a)".

Claim 6, column 17, line 14, delete "the".

Claim 6, column 17, line 20, after "storing" insert --(i)--.

Claim 6, column 17, line 21, after "and" insert --(ii)--.

Signed and Sealed this

Fifth Day of July, 1994

BRUCE LEHMAN

Attest:

*Attesting Officer*  *Commissioner of Patents and Trademarks*